United States Patent
McGee et al.

(10) Patent No.: US 10,071,814 B2
(45) Date of Patent: Sep. 11, 2018

(54) EXHAUST ARRANGEMENT FOR AIRCRAFT HAVING SENSOR

(71) Applicants: Craig S. McGee, Lewisville, TX (US); Sam R. Fritcher, Plano, TX (US)

(72) Inventors: Craig S. McGee, Lewisville, TX (US); Sam R. Fritcher, Plano, TX (US)

( * ) Notice: Subject to any disclaimer, the term of this patent is extended or adjusted under 35 U.S.C. 154(b) by 571 days.

(21) Appl. No.: 14/826,957

(22) Filed: Aug. 14, 2015

(65) Prior Publication Data
US 2016/0311549 A1    Oct. 27, 2016

Related U.S. Application Data

(60) Provisional application No. 62/037,381, filed on Aug. 14, 2014.

(51) Int. Cl.
*B64D 33/04* (2006.01)
*F01D 25/30* (2006.01)
(Continued)

(52) U.S. Cl.
CPC ............ *B64D 33/04* (2013.01); *B64D 27/14* (2013.01); *B64D 47/08* (2013.01); *F01D 25/30* (2013.01); *F02K 1/78* (2013.01)

(58) Field of Classification Search
CPC ............ B64D 33/04; F01D 25/30; F02K 1/78
(Continued)

(56) References Cited

U.S. PATENT DOCUMENTS 3,921,906 A * 11/1975 Nye .................. B64D 33/04
239/127.3
3,930,627 A * 1/1976 Miller .................. B64D 33/04
138/109

(Continued)

FOREIGN PATENT DOCUMENTS

GB       1066268 A     4/1967

OTHER PUBLICATIONS myaviation.net, Photo of Cessna 208B Grand Caravan C-FSUJ of Royal Canadian Mounted Police, added Jun. 26, 2012, obtained from http://www.myaviation.net/search/photo_search.php?id=02179268 on Aug. 13, 2014.
(Continued)

*Primary Examiner* — Brian M O'Hara
*Assistant Examiner* — Keith L Dixon
(74) *Attorney, Agent, or Firm* — Blank Rome LLP

(57) ABSTRACT

An exhaust arrangement is for an aircraft having sensing equipment and a front prop engine. An extension mounts on the underside along an edge of the fuselage to direct exhaust from the engine's exhaust pipes to a point to or past the sensing equipment typically exposed at the mid-section of the aircraft. An extension inlet mounts adjacent the pipe and defines a funnel or conical orifice not directly affixed to the pipe. One or more conductors for the extension then extend from the inlet to convey the exhaust to an outlet of the extension. Preferably, multiple conductors can be used with an expansion joint provided between them. The outlet preferably diverts exhaust away from the tail end of the aircraft. To mount the extension to the aircraft, several arrangements of supports including rods, lugs, angles, and the like hold the extension in vertical, lateral, and axial directions to the aircraft.

20 Claims, 16 Drawing Sheets

(51) Int. Cl.
   *F02K 1/78* (2006.01)
   *B64D 27/14* (2006.01)
   *B64D 47/08* (2006.01)

(58) Field of Classification Search
   USPC .......................................................... 244/54
   See application file for complete search history.

(56) References Cited

U.S. PATENT DOCUMENTS

| | | | | |
|---|---|---|---|---|
| 4,136,518 | A * | 1/1979 | Hurley | F02K 1/825 60/264 |
| 4,244,441 | A * | 1/1981 | Tolman | F01D 25/30 181/213 |
| 4,312,480 | A * | 1/1982 | Miller | B64D 33/04 239/127.3 |
| 4,713,933 | A * | 12/1987 | Bandera | B64D 33/04 239/127.3 |
| 4,840,329 | A | 6/1989 | Szuminski et al. | |
| 5,699,662 | A | 12/1997 | Born et al. | |
| 6,123,290 | A * | 9/2000 | Lavergne | B64D 33/04 244/121 |
| 2010/0181441 | A1 | 7/2010 | Larsen et al. | |
| 2011/0131948 | A1 | 6/2011 | Hollimon et al. | |
| 2013/0127642 | A1 | 5/2013 | Maggiore et al. | |
| 2016/0311555 | A1 * | 10/2016 | Cazenave | B64D 41/00 |

OTHER PUBLICATIONS myaviation.net, Photos of Cessna 208B Grand Caravan C-FSUJ of Royal Canadian Mounted Police, obtained from http://www.myaviation.net/search/search.php?view=&regnr=C-FSUJ on Aug. 13, 2014.

myaviation.net, Photo of Cessna 208B Grand Caravan C-FSUJ of Royal Canadian Mounted Police, added Apr. 7, 2009, obtained from http://www.myaviation.net/search/photo_search.php?id=01566197 on Aug. 13, 2014.

airlines.net, Photos: Cessna 208B Grand Caravan Aircraft Pictures, added Apr. 23, 2007, obtained from http://www.airliners.net/photo/Royal-Canadian-Mounted/Cessna-208B-Grand/1202087/ on Aug. 13, 2014.

J.A. Aero, Inc., "Caravan 208 and 208B Camera Hole Installation," undated, obtained from http://jaair.com/wp-content/uploads/2011/06/JA-Camera-Hole-Install-NP.pdf on Aug. 13, 2014.

Aero Twin, Inc., "Inc.-Cessna Caravan Exhaust Deflector," last updated Nov. 12, 2004, obtained from http://www.aerotwin.com/products/exhaust_deflector.html on Aug. 13, 2014.

Acorn Welding, "Cessna 208/678 Caravan:Exhaust Stack," copyright 2010.

jetphotos.net, Photo of Cessna C-FSUJ, undated, obtained from http://jetphotos.net/viewphoto.php?id=6612302 on Aug. 13, 2014.

flightaware.com, Photo of Cessna C-FSUJ, undated, obtained from http://flightaware.com/photos/view/429970-b7cc11ac53cabd61b7932d74d59f157b00a8ef7d/aircraft/CFSUJ/sort/votes/page/1 on Aug. 13, 2014.

Extended European Search report issued in Counterpart European Patent Application No. 15832217.2 and dated Feb. 16, 2018.

International Search Report and Written Opinion issue in Counterpart International Application No. PCT/2015/045359 and dated Nov. 23, 2015.

\* cited by examiner

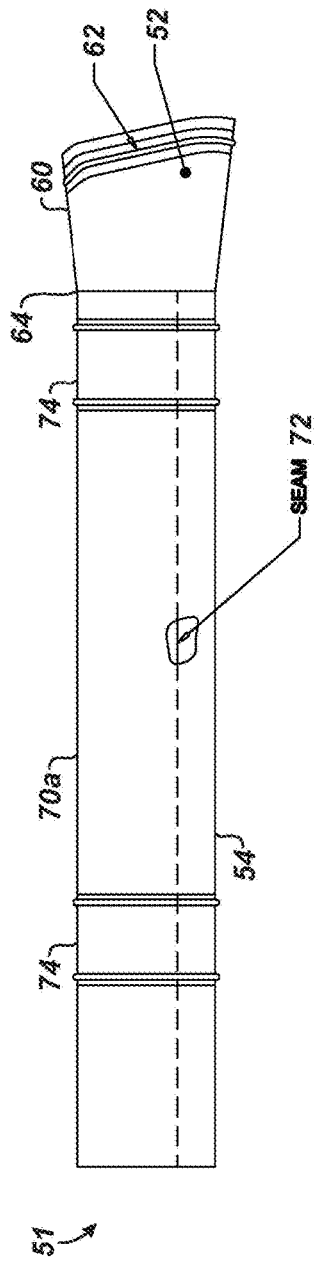
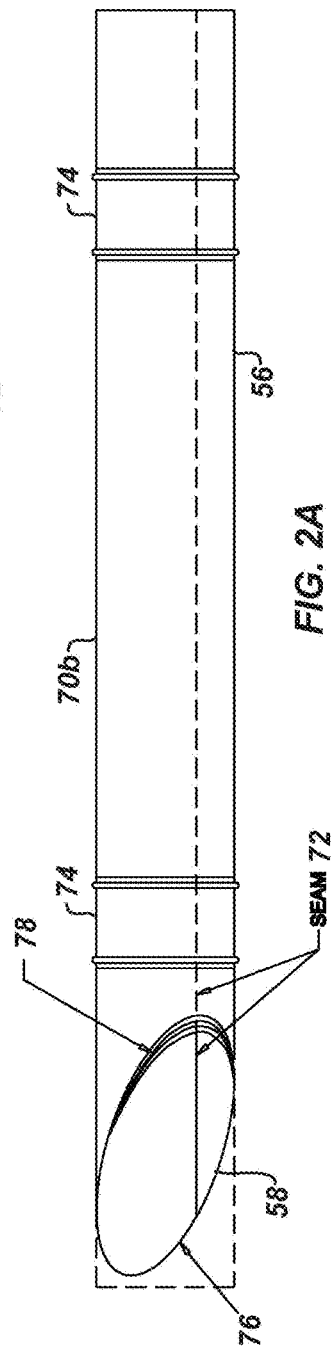
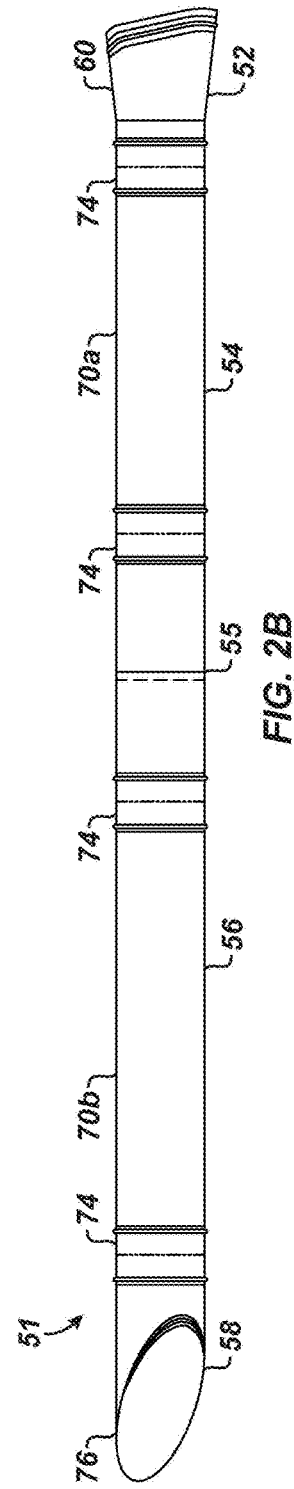
FIG. 2A
FIG. 2B

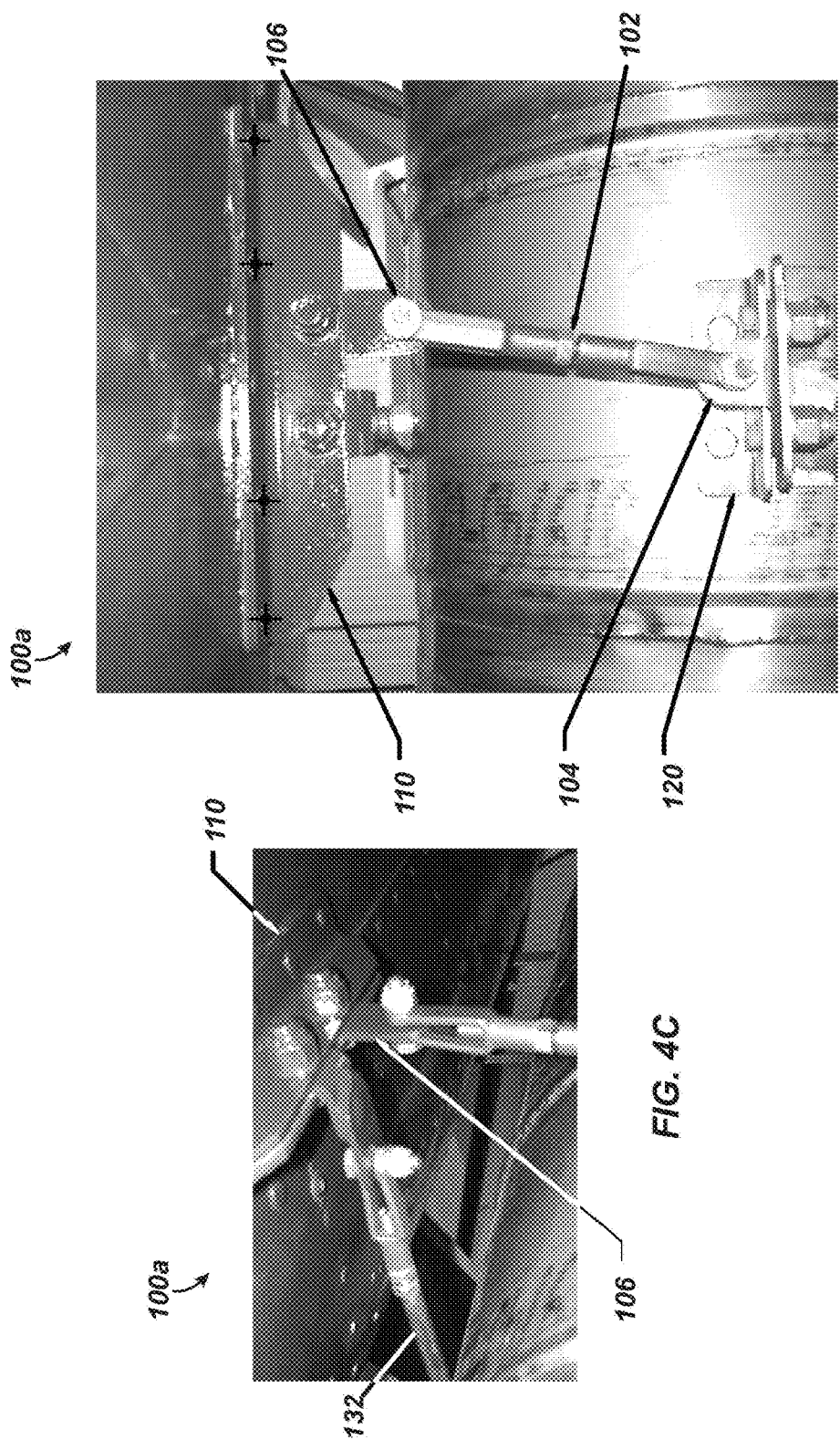

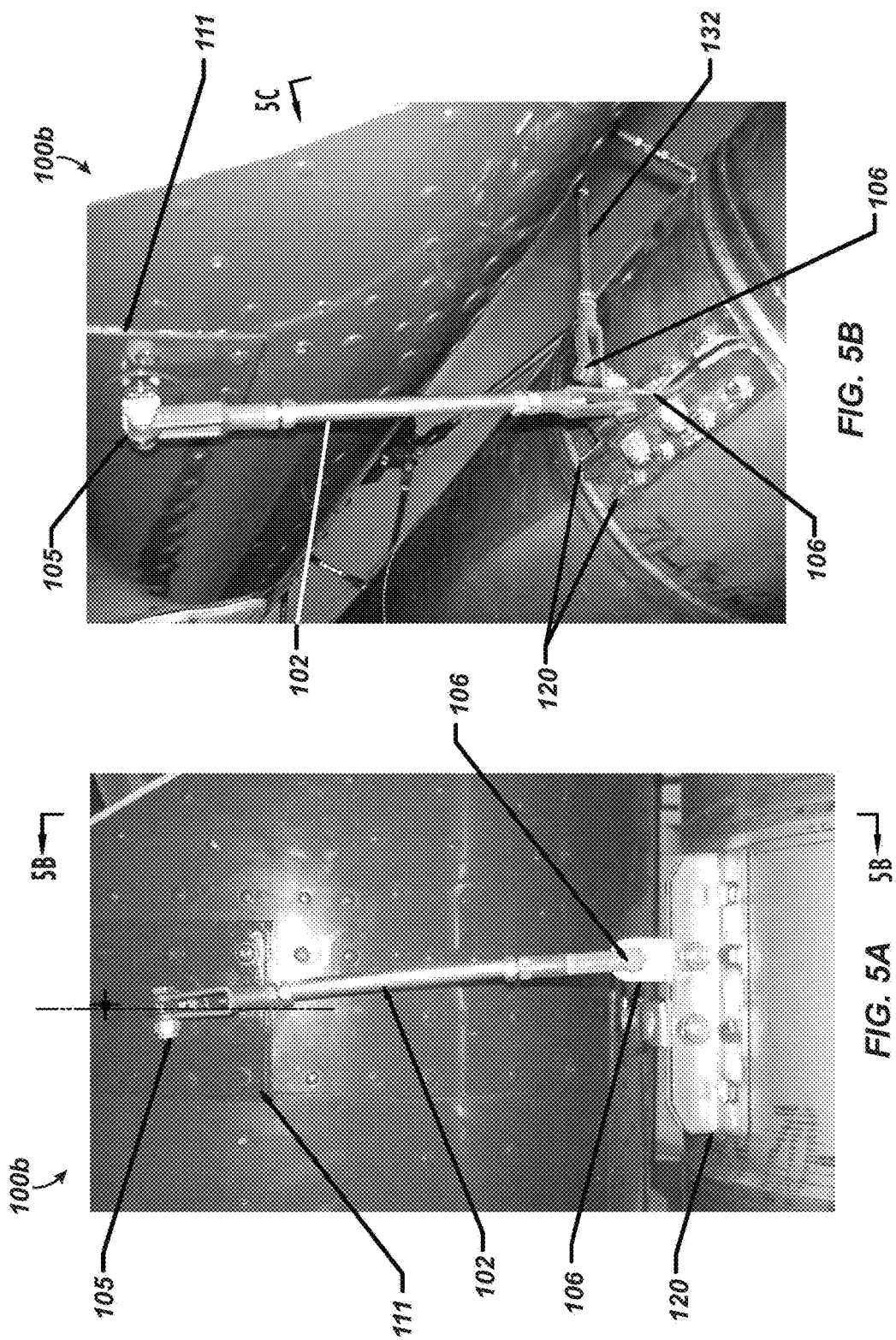

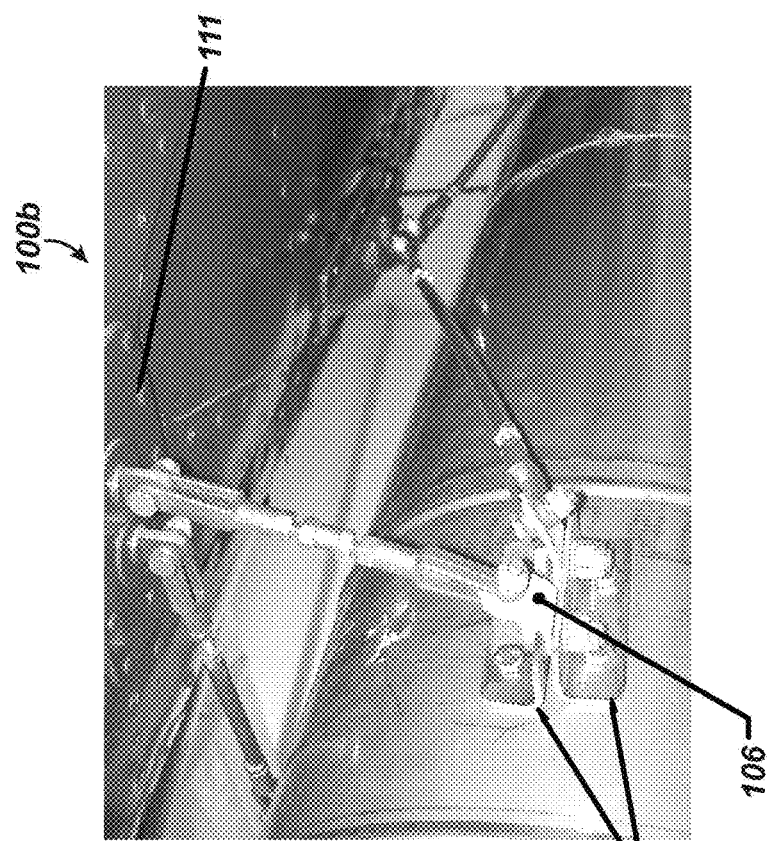
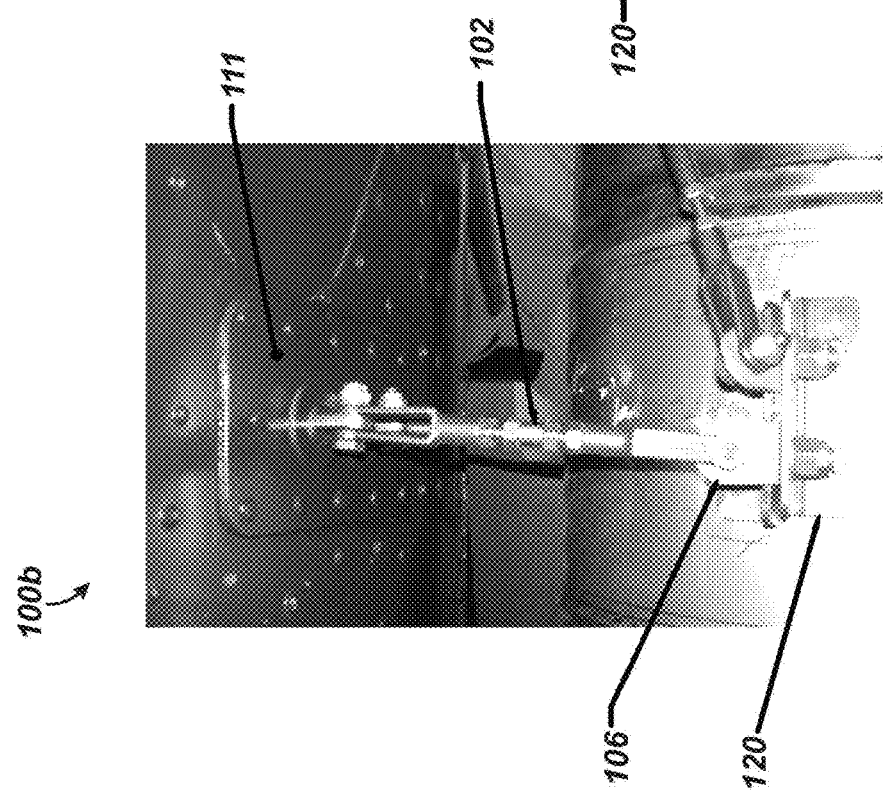
FIG. 5D
FIG. 5C

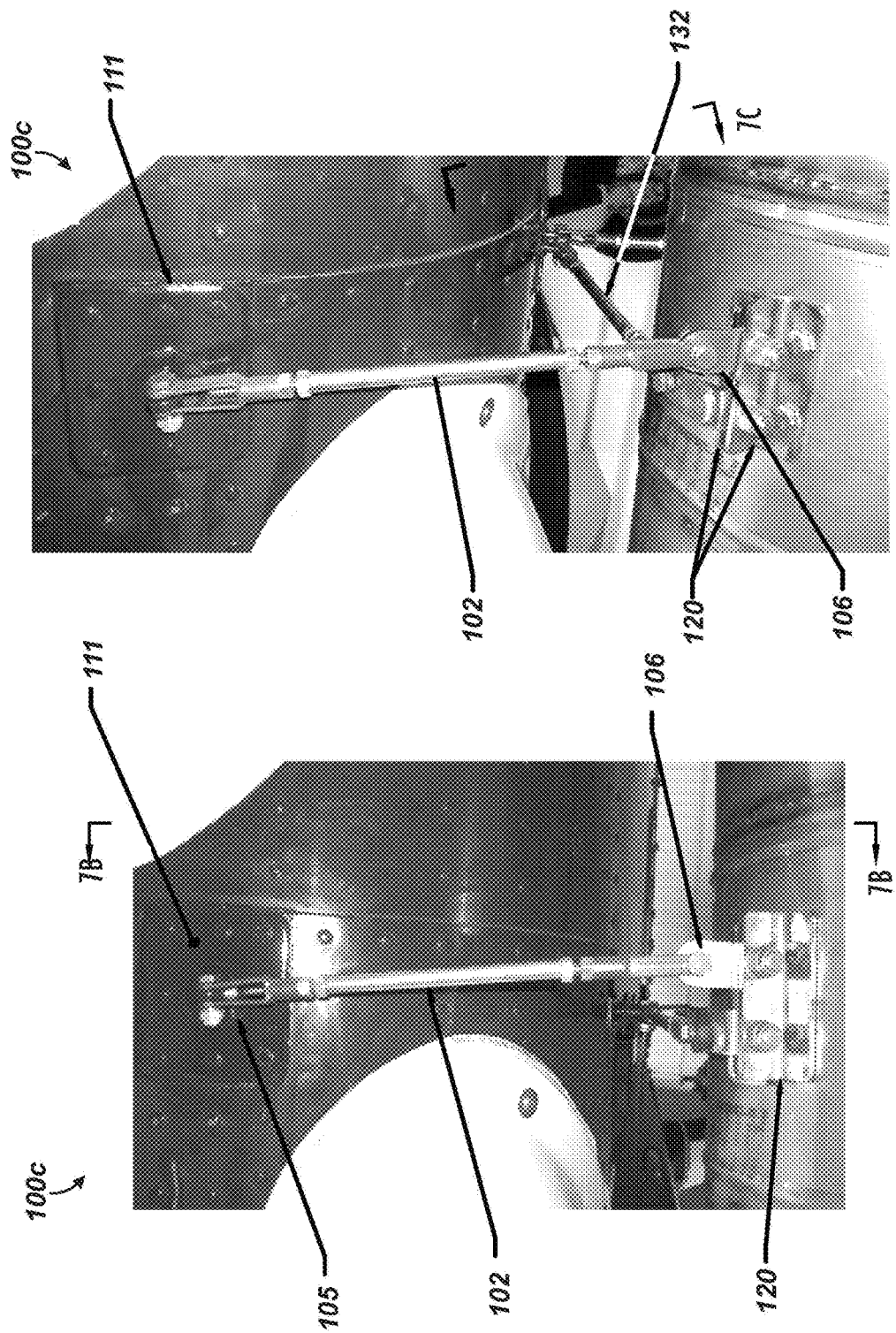

EXHAUST ARRANGEMENT FOR AIRCRAFT HAVING SENSOR

BACKGROUND OF THE DISCLOSURE

Aircrafts may be fitted with (or may carry) various types of sensors for obtaining images, detecting chemicals, and the like. For example, sensing equipment can provide infrared and photographic images with geospatial, chemical, and radiological information. The sensing equipment can use multiple sensors. Example sensors include infrared line scanners, high speed infrared spectrometers, gamma-ray spectrometers, and digital aerial cameras, among others.

The information from the sensors can be used for a number of purposes, such as emergency response, security, environmental surveys, climate monitoring, etc. For instance, the information from the sensing equipment can assess the extent and severity of damage to critical infrastructure during emergencies.

In many cases, the sensors and other instruments are exposed on the bottom of the aircraft to enable the sensing to be directed toward the ground. It may even be necessary to have a window or opening formed in the bottom of the aircraft's fuselage so the sensing equipment can be housed inside the aircraft. Depending on the type of aircraft used, obstructions or interference by aspects of the aircraft can disrupt or alter the sensing capabilities of the sensing equipment. For example, many types of aircraft have exhaust from a front turboprop engine that is directed under the aircraft's fuselage. In these situations, the exhaust can interfere with the sensing capabilities. Other aircraft, such as a twin engine aircraft like an Aero Commander 680 FL/G Platform, may not suffer from these disadvantages.

The subject matter of the present disclosure is directed to overcoming, or at least reducing the effects of, one or more of the problems set forth above.

SUMMARY OF THE DISCLOSURE

An exhaust arrangement is used for an aircraft having sensing equipment and a front prop engine. An exhaust extension mounts on the underside of the aircraft along an edge of the fuselage to directed exhaust from the engine's exhaust pipes to a point to or past the sensing equipment typically exposed at the mid-section of the aircraft. For the extension, an inlet mounts adjacent the exhaust pipe of the engine and defines a funnel or conical orifice not directly affixed to the exhaust pipe. One or more conductors for the extension then extend from the inlet to convey the exhaust to an outlet of the extension. Preferably, multiple conductors can be used with an expansion joint provided between them. The outlet preferably diverts exhaust away from the tail end of the aircraft. To mount the extension to the aircraft, several arrangements of supports including rods, lugs, angles, and the like hold the extension in vertical, lateral, and axial directions to the aircraft.

In one embodiment, an exhaust apparatus for the aircraft includes an inlet, at least one tubular extension, and a plurality of supports. The inlet has a mouth communicating with the engine exhaust, and the mouth defines an intake area larger than the outlet area of the exhaust. The at least one tubular extension has first and second ends and is mountable at a plurality of support locations to the fuselage. The first end is connected in communication to the inlet so that the first end receives exhaust output from the engine exhaust along with intake air from the mouth. The second end extends beyond the location of the sensor;

For the supports, a first support can be disposed at a first of the support locations on the at least one tubular, and the first support can have first, second, and third arms. The first arm pivotally connects between the fuselage and the at least one tubular and supports the same along a first axis. The second arm pivotally connects between the fuselage and the at least one tubular and supports the same along a second axis perpendicular to the first axis. The third arm pivotally connects between the fuselage and the at least one tubular and supports the same in one direction along a third axis perpendicular to the first and second axes.

A second support can be disposed at a second of the support locations on the at least one tubular in a comparable arrangement as the first support. The third arm of the second support can pivotally connected between the fuselage and the at least one tubular and support the same in an opposite direction along the third axis.

BRIEF DESCRIPTION OF THE DRAWINGS

FIG. 2A illustrates a side view of the exhaust extension in partial disassembly.

FIG. 2B illustrates a side view of the exhaust extension in partial assembly.

FIGS. 4A-4D are photographs at different perspectives of a first support arrangement for the exhaust extension.

FIGS. 5A-5D are photographs at different perspectives of a second support arrangement for the exhaust extension.

FIGS. 7A-7C are photographs at different perspectives of a third support arrangement for the exhaust extension.

DETAILED DESCRIPTION OF THE DISCLOSURE

Figure 1A:
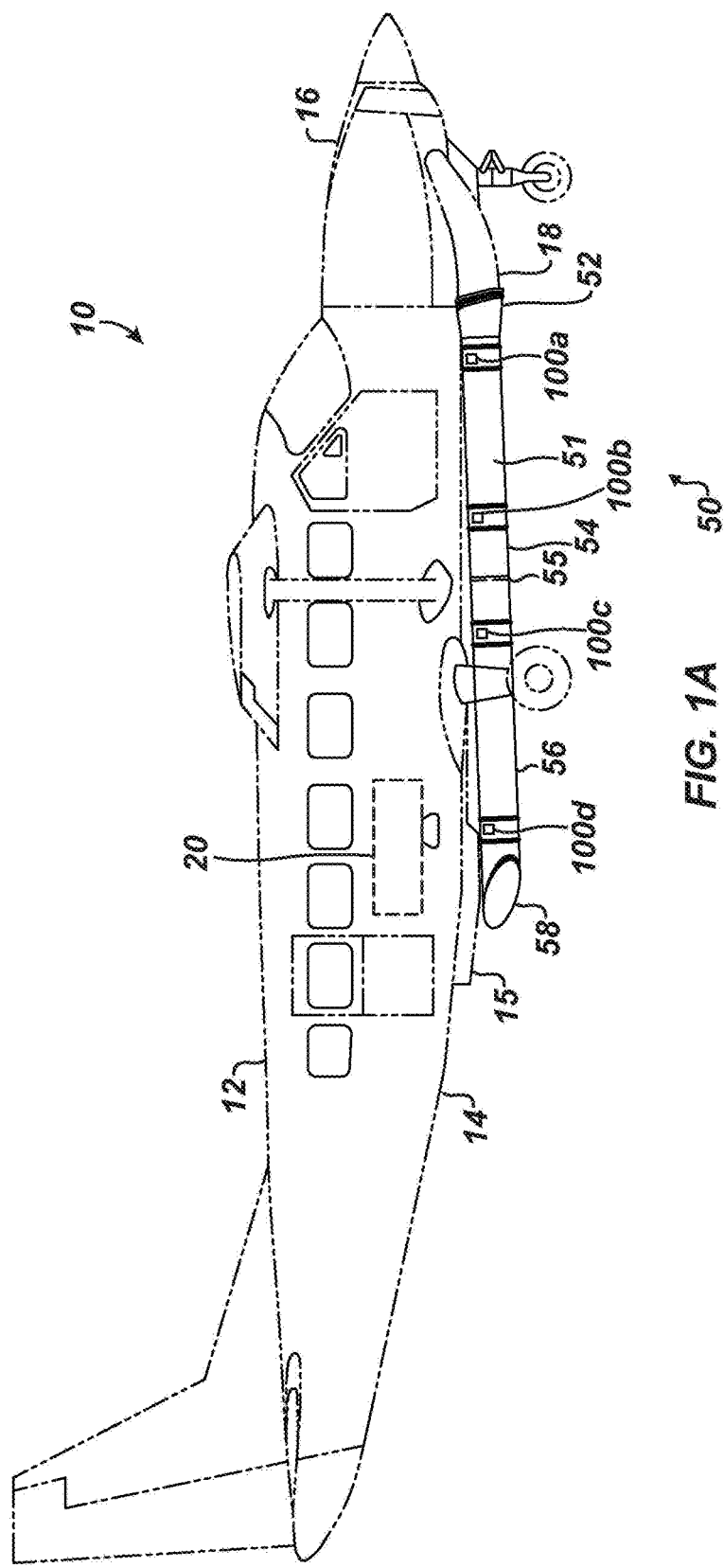
FIG. 1A illustrates a side view of an aircraft having an exhaust arrangement according to the present disclosure.
Figure 1B:
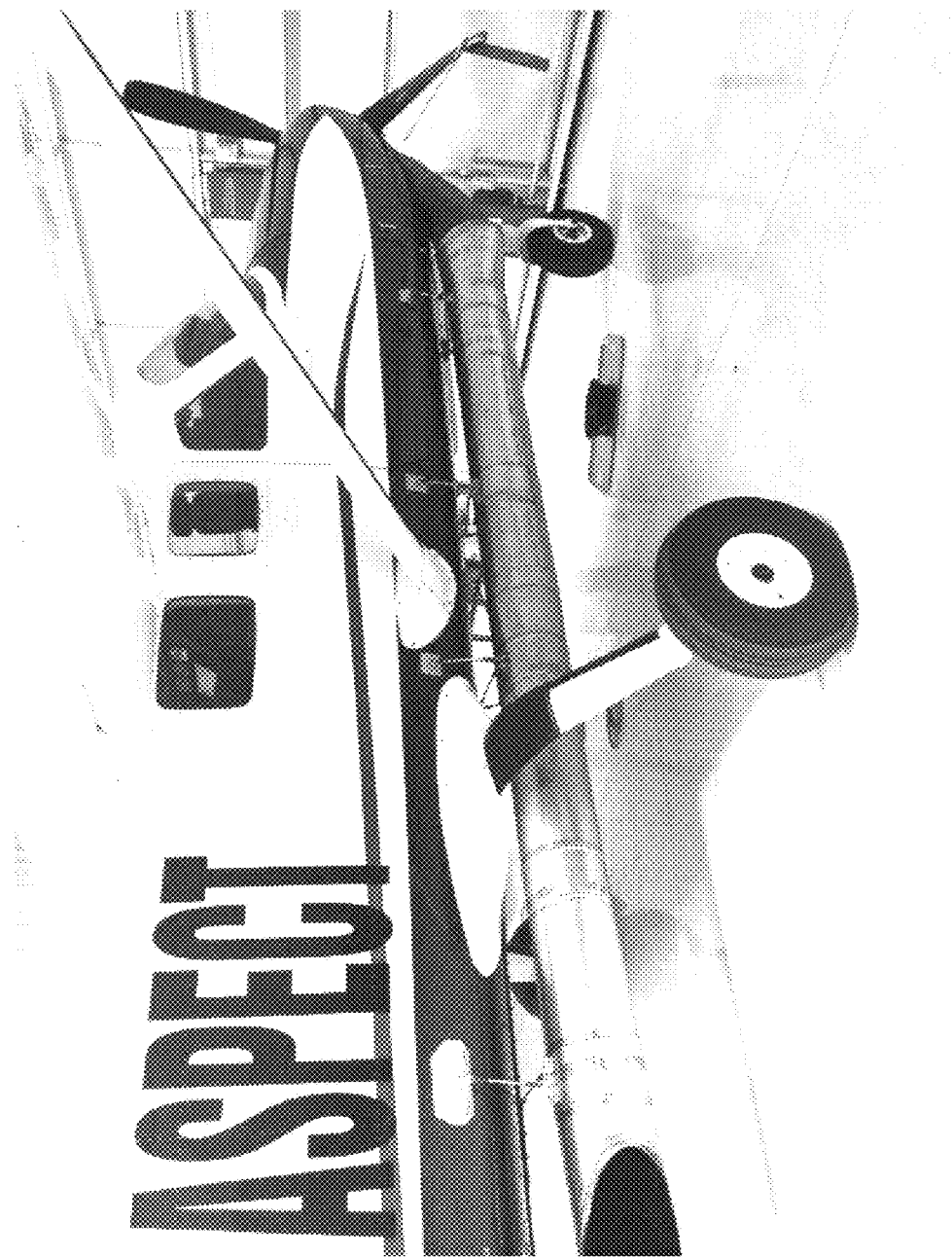
FIG. 1B is a photograph of an aircraft with the disclosed exhaust arrangement.

FIG. 1A illustrates a side view of an aircraft 10 having an exhaust arrangement 50 according to the present disclosure, and FIG. 1B is a photograph of the aircraft 10 with the disclosed exhaust arrangement 50.

As is typical, the aircraft 10 has a fuselage 12 with an underside 14. A prop engine 16 is mounted at the nose of the aircraft 10, and the exhaust pipe 18 branches from the engine 16 to direct exhaust to the underside 14 of the aircraft 10. Being used for reconnaissance, imaging, detection, and the like, the aircraft 10 has sensing equipment 20, which can be stored, mounted, housed, etc. in or on the aircraft 10. Because the aircraft 10 will fly over an area to perform its sensing, the underside 14 may include a door 15, window, or the like so the sensing equipment 20 can be directed out of the aircraft 10 to the ground.

In the current example, the exhaust arrangement 50 is shown used on a Cessna 208B Caravan aircraft 10, although any comparable aircraft can benefit from the disclosed arrangement 50. For instance, other aircraft that can be used with sensing equipment and can benefit from the disclosed exhaust arrangement 50, include, but are not limited to, those having a single prop engine at the nose of the aircraft. Also in the current example, the exhaust arrangement 50 is shown redirecting the exhaust airflow from a Pratt & Whitney PT6 turboprop engine 16 to the aft section of the aircraft 10, although other types of engines can benefit from the disclosed arrangement 50. Finally, the typical exhaust pipe 18 from the engine 16 provided on an aircraft may have its own particular shape and design. Sometime, exhaust pipes have outlets that curve or flare away from the aircraft, or they may have other eccentricities designed into them. With that said, it may be necessary to alter the shape of the exhaust pipe 18, for example, by simplifying its termination. As but one example, the termination of the exhaust 18 in the current example may be stunted, and as further shown in FIG. 1C, a simplified funnel, end, or the like with mounting arms can be affixed to the end of the exhaust pipe 18.

The exhaust arrangement 50 conducts the exhaust from the engine 16 away from the sensing equipment 20 so that the heat, particles, and the like from the exhaust do not interfere, disrupt, or alter the sensing capabilities of the carried sensing equipment 20. As depicted here, only one side of the aircraft 10 has the exhaust arrangement 50 because the particular aircraft 10 only has one exhaust pipe 18. However, it is understood that the other side of the aircraft 10 may have a comparable exhaust arrangement 50 leading from another exhaust pipe 18, if present.

The exhaust arrangement 50 has an exhaust extension 51, which can have several components or pieces 52, 54, 56, and 58. In particular, the extension 51 includes an inlet 52 in line with the exhaust pipe 18 from the engine 16. One or more conductors 54 and 56 extend from the inlet 52 to conduct the exhaust along the underside 14 of the aircraft 10, typically at the fuselage's outer edge so that the underside 14 remains relatively unobstructed. The exhaust extension 51 then ends at an outlet 58, which can preferably be at least at or after the location of the sensing equipment 20.

The exhaust arrangement 50 also has arrangements 100*a-d* of supports that affix and hold the components 52, 54, 56, and 58 to the aircraft's fuselage 12. Further details of these support arrangements 100*a-d* as well as the exhaust components 52, 54, 56, and 58 are discussed later.

The exhaust arrangement 50 allows for the collection of scientific and imaging data that is not distorted by heat and hydrocarbons coming from the engine's exhaust. The data may be collected and processed by an array of sensors in the equipment 20 installed inside the aircraft 10. The equipment 20 may be exposed in an access opening 15 located along and aft of the aircraft's centerline. For the example Cessna aircraft, the access opening 15 may extend be about a 20-in. wide by 30-in. long in the underside 14 of the aircraft 10.

The exhaust arrangement 50 may also reduce the effects of exhaust soot accumulation and heat damage to the aircraft 10. Further, as an added safety benefit, the exhaust arrangement 50 can allow the copilot to exit the aircraft 10 with the engine 16 running without being subjected super-heated exhaust.

Figure 1C:
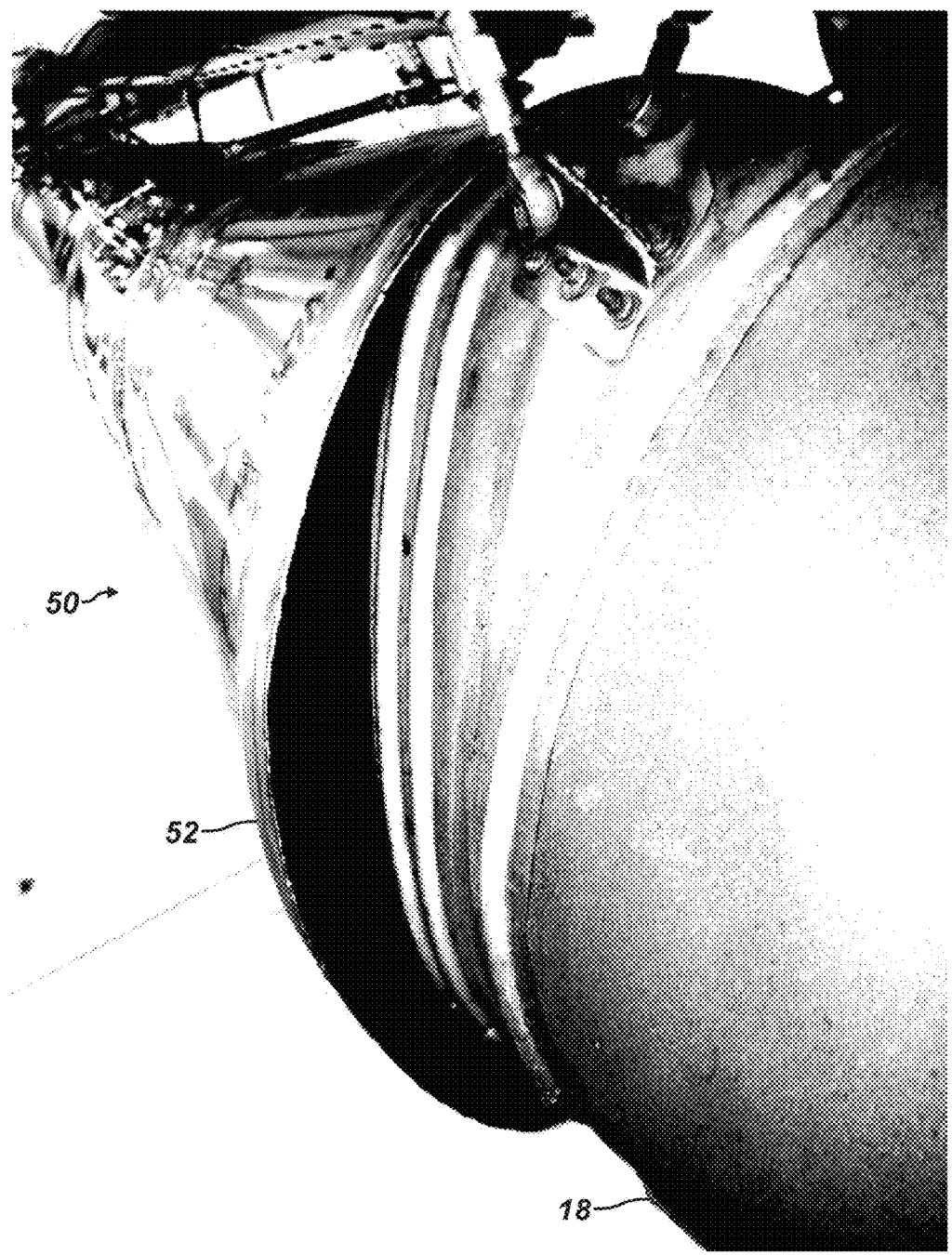
FIG. 1C is a photograph showing a close up of the inlet end of an exhaust extension for the disclosed exhaust arrangement.

Because the exhaust arrangement 50 extends from the engine 16, it should not significantly alter the performance of the engine 16. To prevent producing backpressure on the engine 16 at its exhaust, the inlet 52 has an open front design. In particular, FIG. 1C is a photograph showing a close up of the inlet 52 of the exhaust arrangement 50. As can be seen, the inlet 52 defines a wider opening than the outlet of the engine's exhaust pipe 18. As exhaust exits the exhaust pipe 18, it feeds into the wider inlet 52. This can create a venturi effect that ducts all of the engine exhaust to the back of the aircraft 10 through the extension 51 and does not create significant back pressure that could impede the life and performance of the engine 16.

Because the exhaust arrangement 50 mounts to the aircraft 10, it should also not significantly alter the performance of the aircraft 10. Indeed, fight testing has determined there is no significantly measurable difference in the aircraft's flight performance with the exhaust arrangement 50 installed. This is due at least in part to the construction of the exhaust arrangement 50 and the support arrangements 100*a-d* used, which will now be described in more detail below.

FIG. 2A illustrates a side view of the exhaust extension 51 in partial disassembly, and FIG. 2B illustrates a side view of the exhaust extension 51 in partial assembly. As already noted, the exhaust extension 51 has the inlet 52, the conductors 54 and 56, and the outlet 58. The inlet 52 is a cone or funnel 60 with a reinforced front edge 62 that disposes in line with the engine's exhaust pipe (18). The back edge 64 of the funnel 60 welds to a first of the conductors 54. For its part, the first conductor 54 is a tube 70*a*, which can be formed from metal welded along a seam 72. Reinforcement members 74 are used at certain points along the tube 70*a*, especially where the support arrangements (not shown) are positioned as discussed below. These reinforcement members 74 can be composed of complete cylindrical sections of tubing to which the formed tube 70*a* affixes using ribs and welds as discussed later. As such, the reinforcement members 74 can have the same or greater thickness than the rest of the conductor 54, but can also have more hoop strength. Various components of the exhaust arrangement 50 can be composed of metal, such as stainless steel, and components of the exhaust extension 51 are preferably composed of an alloy metal, such as Inconel®. (INCONEL is a registered trademark of Special Metals Corporation.) Overall, the exhaust extension 50 can extend a length of over 12-ft. and can weight about 48-lbs.

The second conductor 56 is similarly configured as the first conductor 54 and includes a tube 70*b*, seam 72, reinforcement members 74, etc. At its end, the second conductor 56 has the outlet 58, which can be a slanted opening 76 (e.g., elliptical cross-section of the tube's cylindrical shape). As best shown in FIG. 2B, the tubes 70*a-b* fit together end-to-end in a telescopic expansion joint 55, which can allow for expansion and play along the extension 51 due to heat, vibration, twisting, and the like.

Figure 3A:
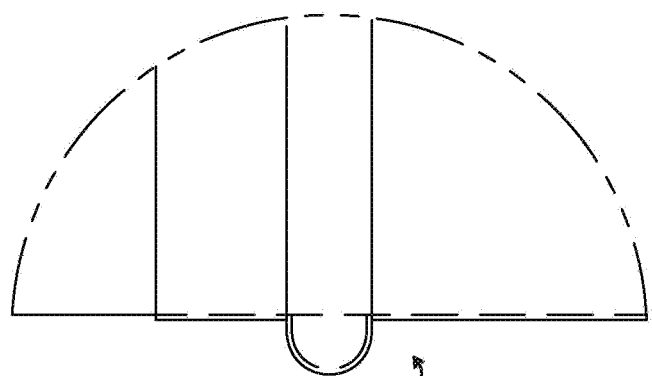
FIGS. 3A-3B illustrate details of reinforced areas for the exhaust extension.
Figure 3B:
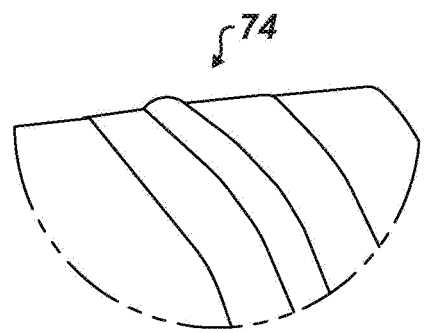
Figure 3C:
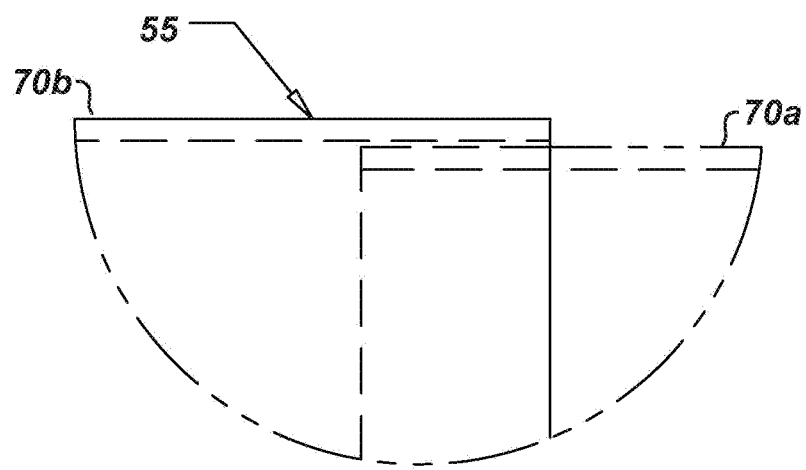
FIG. 3C illustrates a detailed side view of an expansion joint for the exhaust extension.

As shown in FIGS. 3A-3B, the reinforcement members 74 of the extension 51 can be affixed to the tube 70*a-b* using a configuration of bead and weld at the interlocking cylindrical members. As shown in FIG. 3C, the expansion joint 55 between the conductors' tubes 70*a-b* can use a telescopic arrangement of the first conductor's tube 70*a* disposed partially inside the second conductor's tube 70*b*. A reverse arrangement could also be used.

Having an understanding of the extension 51, discussion now turns to the various support arrangements 100*a-d* used to support the extension 51 to the aircraft 10. Returning briefly to FIG. 1A, a first support 100a can affix a first end of the first conductor 54 at a point after the inlet 52 to the aircraft 10, and a second support 100b can affix a second end of the first conductor 54 at a point before the expansion joint 55 to the aircraft 10. In a mirrored fashion, a third support 100c can affix a first end of the second conductor 56 at a point after the expansion joint 55 to the aircraft 10, and a fourth support 100d can affix a second end of the second conductor 56 at a point before the outlet 58 to the aircraft 10. The second and third supports 100b-c affix are disposed on either side of a lift strut for the wing of the aircraft 10.

Because the extension 51 mounts to the aircraft 10 with the supports 100a-d, the arrangement 50 will be subject to the stresses and conditions encountered during flight. Therefore, the support arrangements 100a-d used to mount and hold the extension 51 to the aircraft 100 need to accommodate these conditions. For example, the support arrangements 100a-d and the extension 51 need to have some built in flexibility to compensate for vibrations, turbulence, and movement during flight. Additionally, any attachment to the aircraft's fuselage 12 should not overly stress the fuselage's skin or hull so that the supports 100a-d preferably distribute stresses and loads appropriately.

Because the aircraft 10 may be outfitted with just one such exhaust arrangement 50 on one side of the aircraft 10, it should not be overly cumbersome or heavy. The arrangement 50 should have a low profile and not overly produce drag or significantly alter the stall characteristics of the aircraft 10. As will be appreciated, these and other considerations need to be considered.

Each of these supports 100a-d use arrangements of rods 102, 132 and 134; lugs 104, 106, and 108; angles 110 and 120; and doublers 111. The lugs 104 and 106 are affixed between pairs of angles 110 and 120, as the case may be, using bolts, and the rods 102, 132, and 134 affix to tabs on the lugs 104, 106, and 108 using bolts and clevises 103. The tabs on the lugs 104 and 106 can be bent or angled as needed to direct the rods 102, 132, and 134. The angles 110 affix to the aircraft 10 preferably using rivets or the like, and the other angles 120 can affix to the extension 51 using bolts. The doublers 110 can also affix to the aircraft 10 using rivets. As will be appreciated, other forms of fastening can be used, and the particular shapes, sizes, and configurations of these various components may differ depending on the implementation. Therefore, what follows is meant to be an illustrative example.

Figures 4A, 4B:
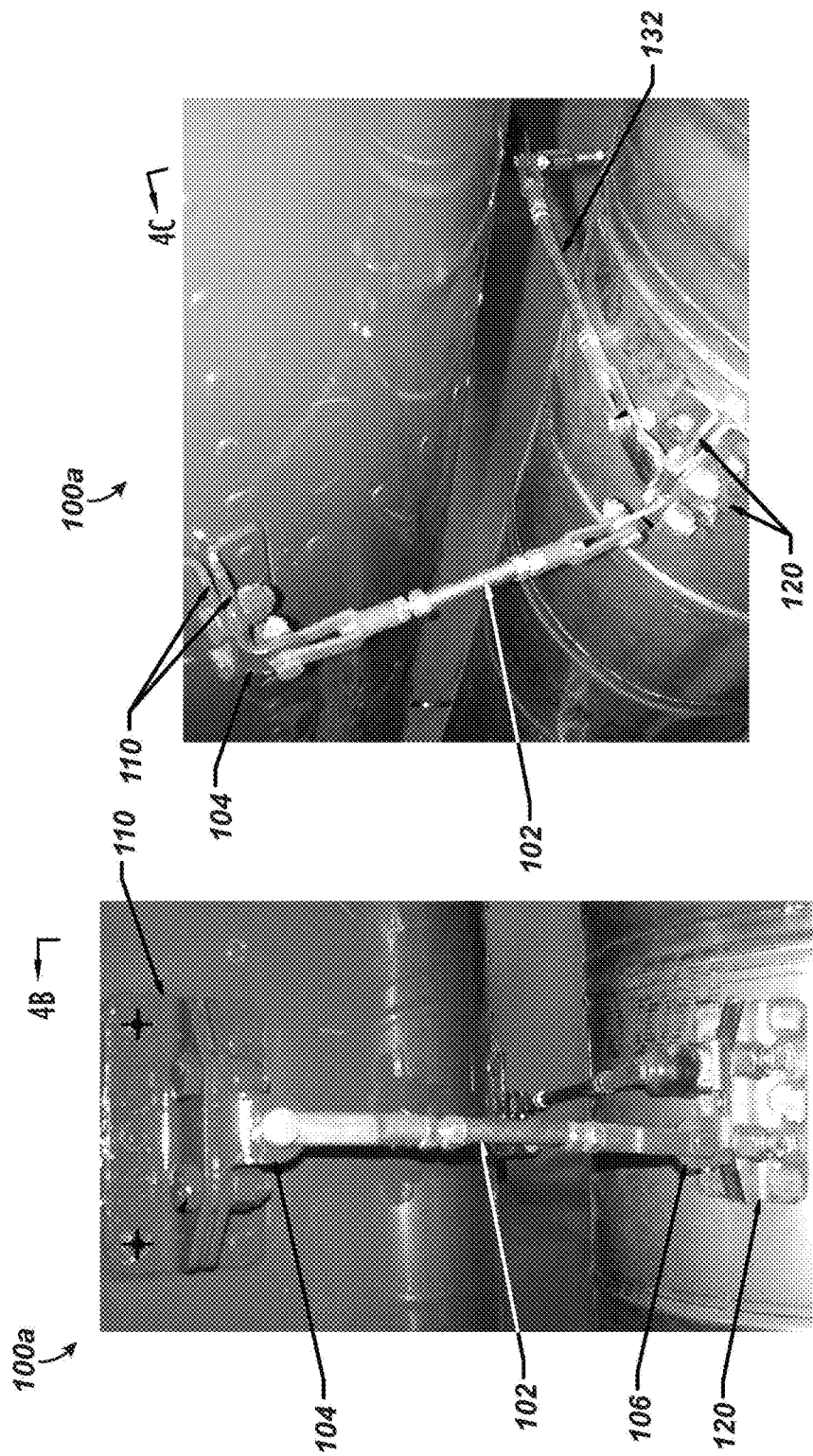

As shown in FIG. 4A, for example, the first support 100a uses a first rod 102 affixed at one end to a lug 104 and angles 110 to the aircraft 10 and affixed at an opposite end to a lug 106 and angles 120 to the extension 51. As noted herein, the support 100a preferably affixes to a reinforced area of the extension 51 provided by the reinforcement member 74.

Figure 9A:
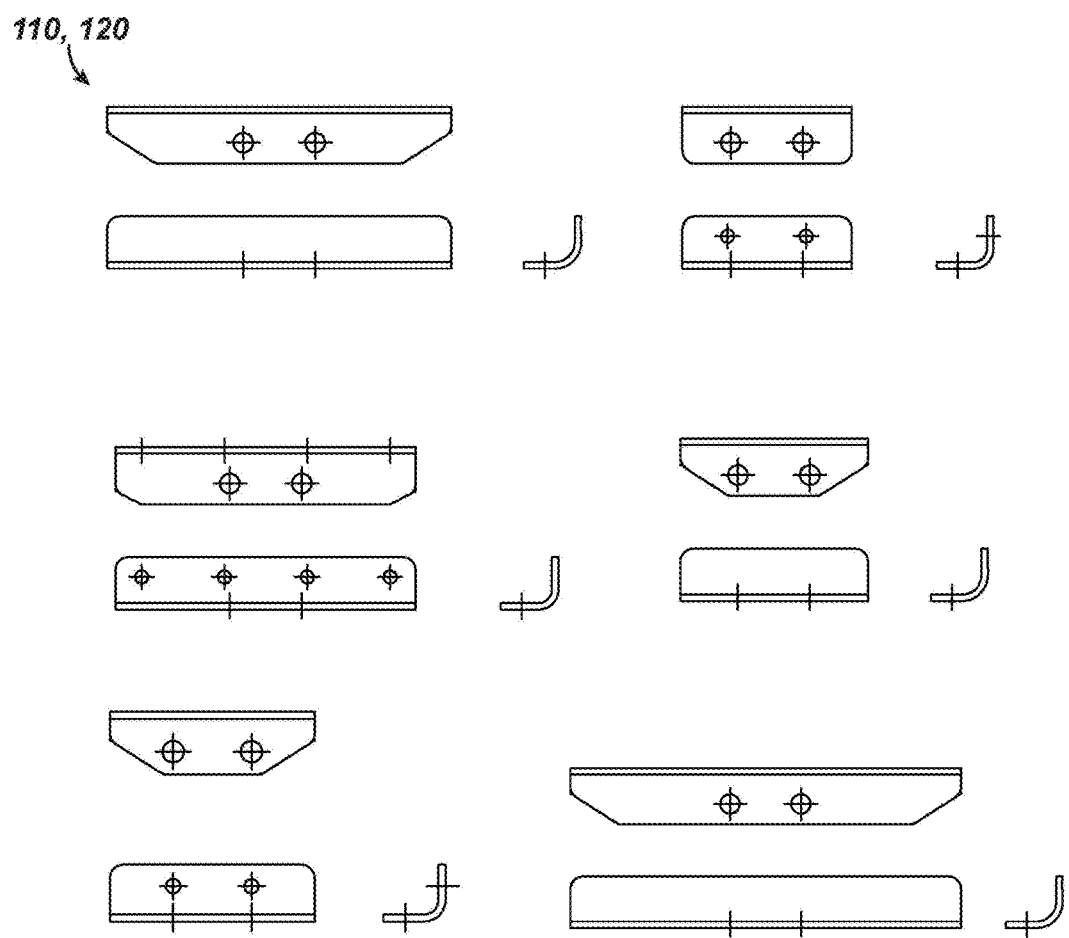
FIG. 9A illustrates plan views of various angles for the disclosed support arrangements.
Figure 9D:
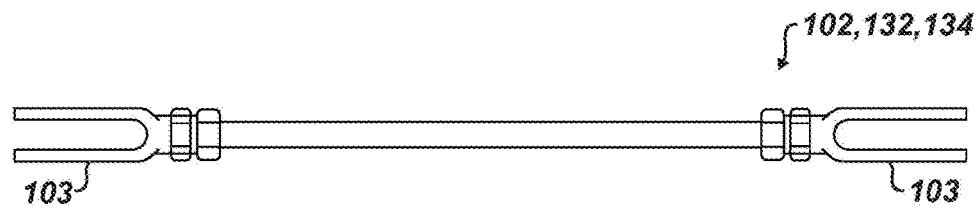
FIG. 9D illustrates a side view of a rod assembly for the disclosed support arrangements.

The ends of the rod 102 couple to the lugs 104, 106 with clevises 103. (FIG. 9D illustrates a side view of a rod assembly having a rod 102 and clevises 103. The rod 102 can have threaded ends so that the distances between the clevises 103 can be adjusted.) This first rod 102 is intended to provide primarily vertical support of the extension 51 to the aircraft 10—the vertical support being along a first axis between the fuselage and the extension 51.

As shown in FIG. 4B-4C, the first support 100a also uses a second rod 132 affixed at one end to the lug 106 and angles 120 on the extension 51 and affixed at an opposite end to a lug 104 and angles 110 to the aircraft 10. Again, the ends of the rod 132 couple to the lugs 104, 106 with clevises 103. This second rod 132 is intended to provide primarily lateral support of the extension 51 to the aircraft 10—the lateral support being along a second axis between the fuselage and the extension 51 that is roughly perpendicular to the first axis.

As further shown in FIG. 4C-4D, the first support 100a also uses a third rod 102 affixed at one end to the lugs 106 and angles 110 on the aircraft 10 and affixed at an opposite end to a lug 104 and angles 120 to the extension 51. Again, the ends of the rod 102 couple to the lugs 104, 106 with clevises 103. This third rod 102 is intended to provide primarily vertical support of the extension 51 to the aircraft 10 along the first axis.

Figure 7C:
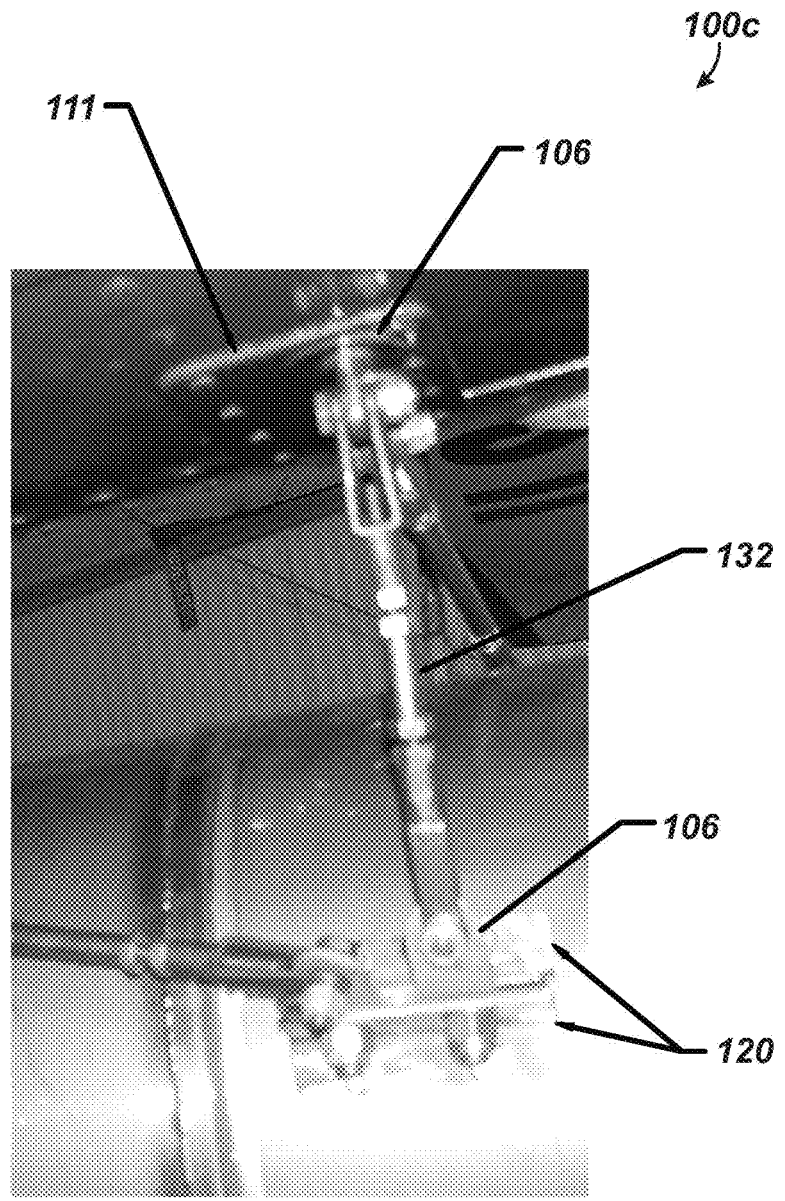
Figures 8A, 8B:
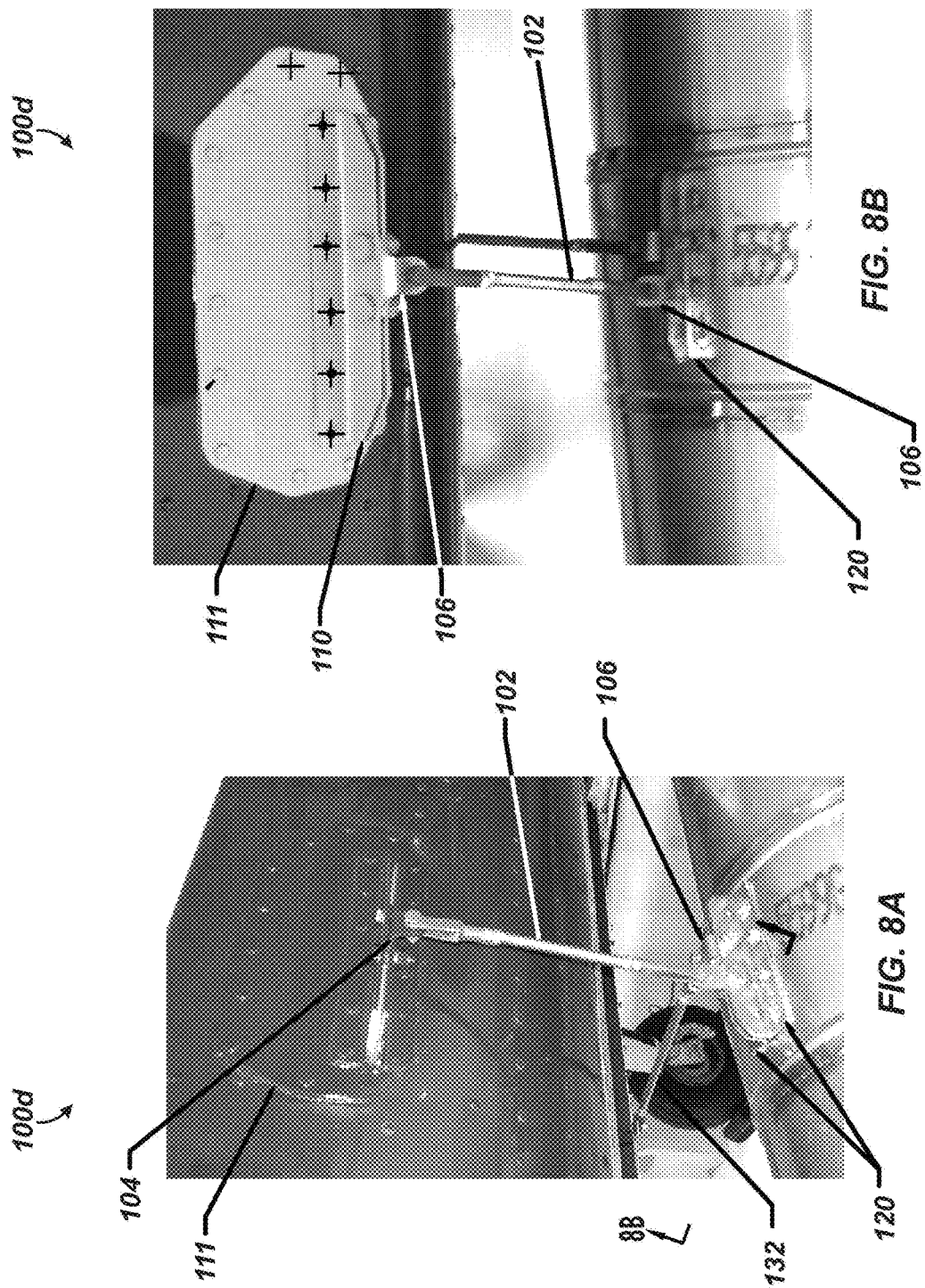
FIGS. 8A-8C are photographs at different perspectives of a fourth support arrangement for the exhaust extension.
Figure 8C:
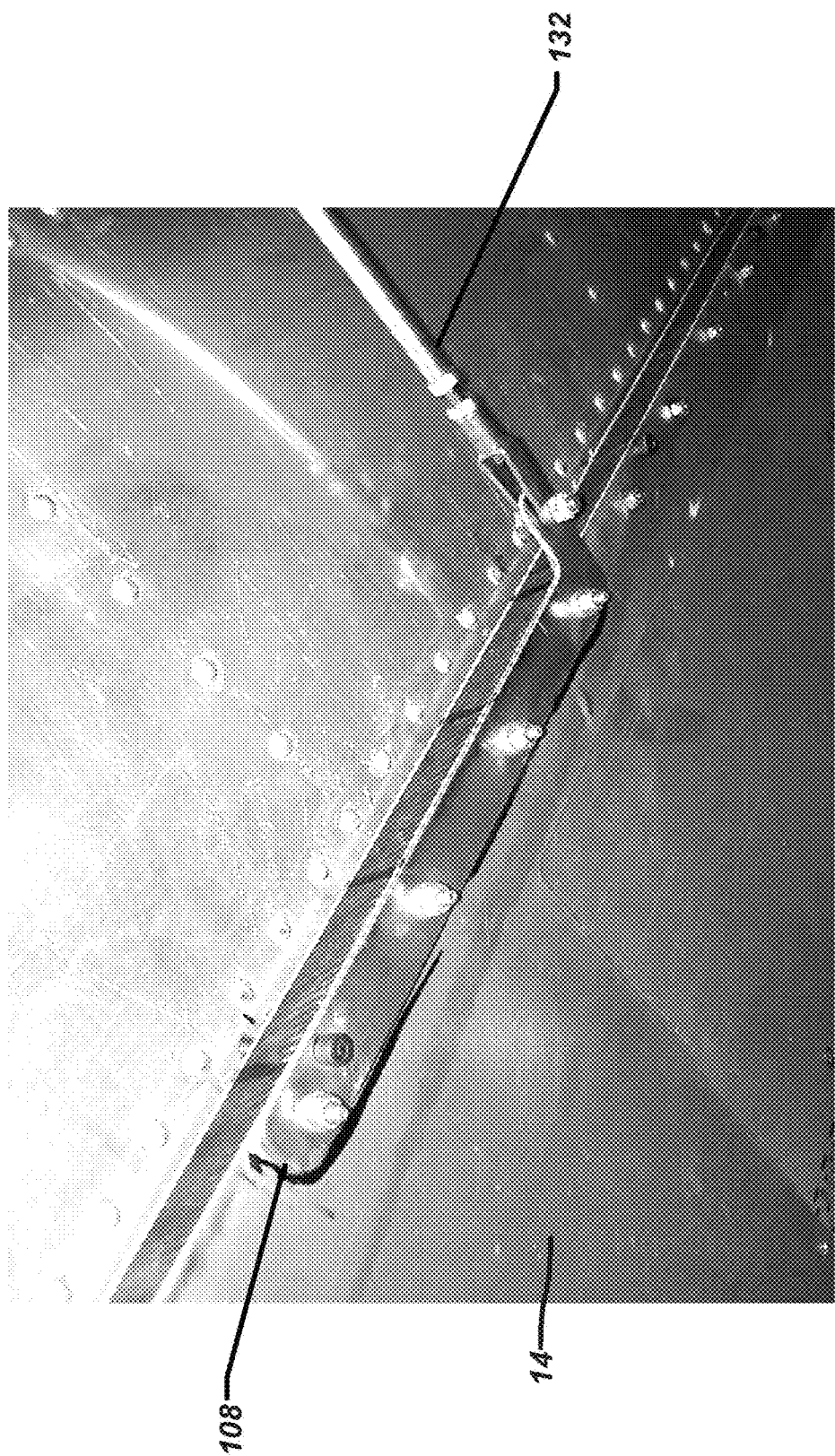

The second support 100b (FIGS. 5A-5D), third support 100c (FIGS. 7A-7C), and fourth support 100d (FIGS. 8A-8C) have similar arrangements of rods 102 and 132, lugs 104 and 106, angles 110 and 120, etc. However, to maintain a uniform outer surface to portions of the aircraft, doublers 111 instead of angles 110 may be used for connecting to the aircraft 10. Also, the last lug or bracket 108 (FIG. 8C) may affix directly to a seam or portion of the aircraft 10 and may have an elongated shape to distribute load.

Figure 9B:
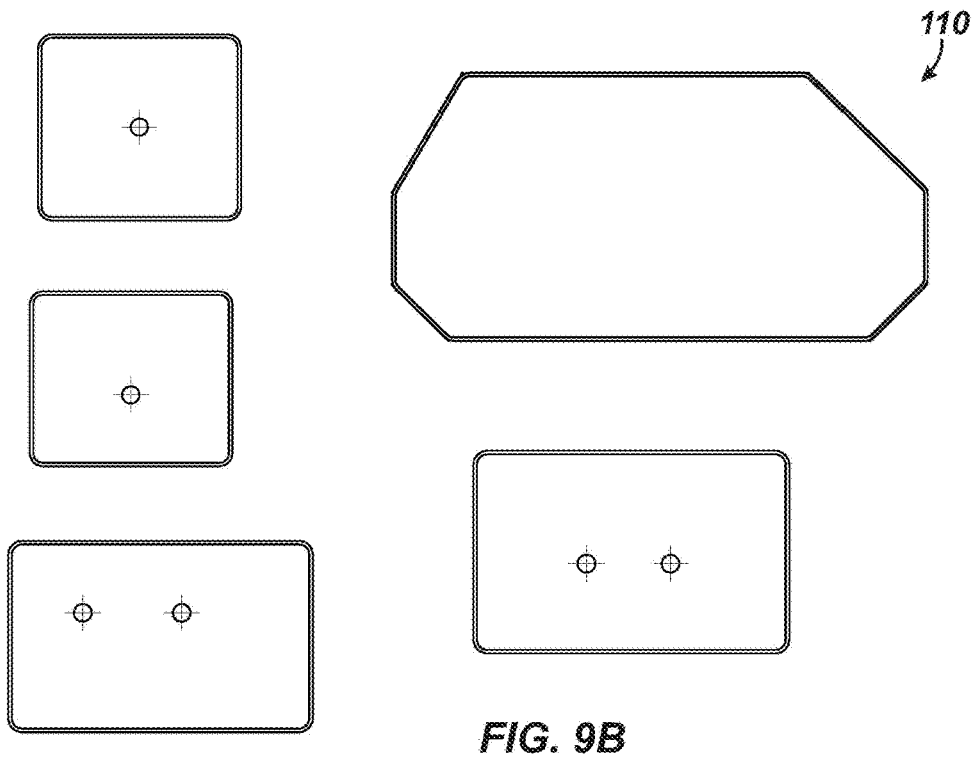
FIG. 9B illustrate plan views of various doublers for the disclosed support arrangements.
Figure 9C:
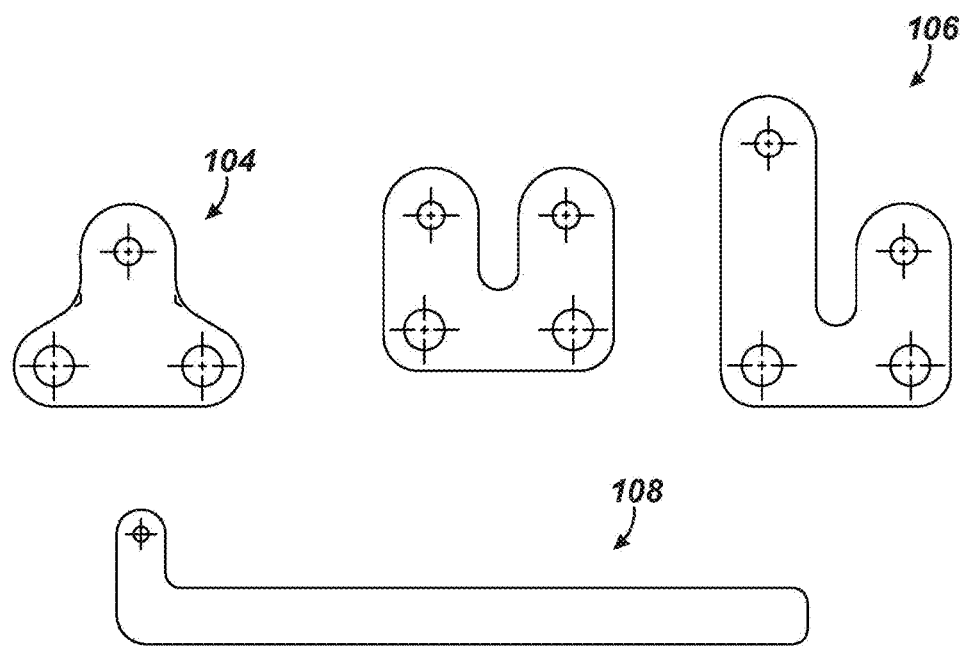
FIG. 9C illustrate plan views of various lugs for the disclosed support arrangements.

These components of lugs, angles, doublers, and the like can have shapes and configurations that depend on the location of these components on the aircraft 10 and the extension 51. As some example, FIG. 9A illustrates various angles 110 and 120, FIG. 9B illustrate various doublers 111, and FIG. 9C illustrate various lugs 104, 106, and 108 for the disclosed support arrangements 100a-d.

Figure 6A:
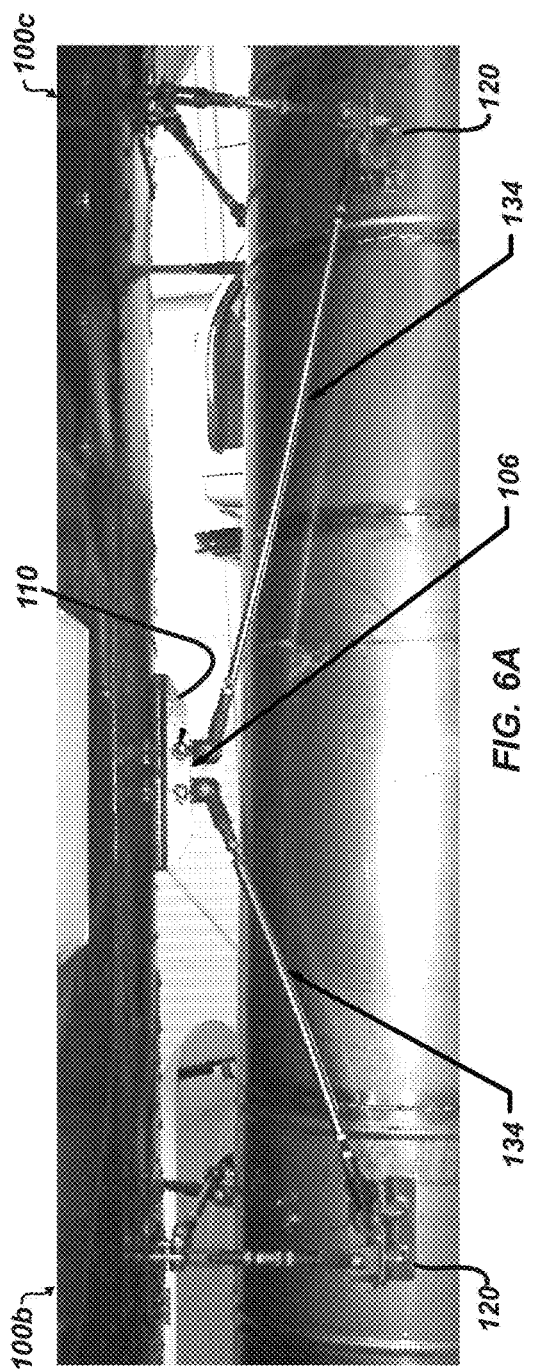
FIGS. 6A-6B are photographs at different perspectives of an intermediate support for the exhaust extension.
Figure 6B:
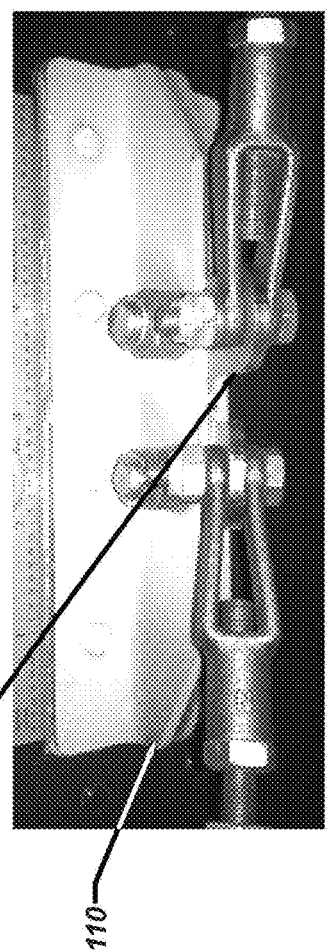

Between the second and third supports 100b-c and the expansion joint 55 of the extension 51, the support arrangement includes an intermediate support, which is shown particularly in FIGS. 6A-6B. A first rod 134 extends from the lug 106 and angles 120 of the second support 100b on the extension 51 to a lug 106 and angles 110 on the aircraft 10. In a mirrored fashion, a second rod 134 extends from the lug 106 and angles 120 of the third support 100c on the extension 51 to the lug 106 and angles 110 on the aircraft 10. These rods 134 are intended to provide primarily axial support of the extension 51 to the aircraft 10 (i.e., support along the length of the extension 51)—the axial support being along a third axis between the fuselage and the extension 51 that is perpendicular to the first and second axes mentioned above. Because the rods 134 extend in opposing directions, they provide opposing axial support along the third axis.

As can be seen, the various rods 102, 132, and 134 with clevises 103 work together to provide vertical, lateral, and axial support of the extension 51 to the aircraft 10 and provide for some adjustment, play, shifting, or the like as they distribute load and accommodate vibrations, turbulence, etc.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. An exhaust apparatus for an aircraft, the aircraft having a fuselage, an engine exhaust with an outlet area disposed at a nose of the aircraft, and a sensor disposed at a location of the fuselage, the apparatus comprising:
   an inlet having a mouth communicating with the engine exhaust, the mouth defining an intake area larger than the outlet area of the exhaust;
   at least one tubular extension having first and second ends and mountable at a plurality of support locations to the fuselage, the first end connected in communication to the inlet, the first end receiving exhaust output from the engine exhaust along with intake air from the mouth, the second end extending beyond the location of the sensor;
   a first support disposed at a first of the support locations on the at least one tubular, the first support having first, second, and third arms, the first arm pivotally connected between the fuselage and the at least one tubular and supporting the same along a first axis, the second arm pivotally connected between the fuselage and the at least one tubular and supporting the same along a second axis perpendicular to the first axis, the third arm pivotally connected between the fuselage and the at least one tubular and supporting the same in one direction along a third axis perpendicular to the first and second axes; and
   a second support disposed at a second of the support locations on the at least one tubular, the second support having first, second, and third arms, the first arm pivotally connected between the fuselage and the at least one tubular and supporting the same along the first axis, the second arm pivotally connected between the fuselage and the at least one tubular and supporting the same along the second axis, the third arm pivotally connected between the fuselage and the at least one tubular and supporting the same in an opposite direction along the third axis.

2. The apparatus of claim 1, wherein the at least one tubular comprises first and second tubular telescopically connected together.

3. The apparatus of claim 1, wherein the support locations of the at least one tubular each comprise reinforced rings disposed on the at least one tubular.

4. The apparatus of claim 1, wherein the at least one tubular comprises sheet metal rolled into a cylinder and affixed along a seam.

5. The apparatus of claim 1, wherein the second end of the at least one tubular defines an elliptical output facing away from a side of the fuselage.

6. The apparatus of claim 1, wherein the first and second supports are disposed on either side of a lift strut of a wing of the aircraft.

7. The apparatus of claim 1, wherein a first end of the first arms for the first and second supports each pivotally connect to a first doubler affixed to the fuselage; and wherein a second end of the first arms for the first and second supports each pivotally connect to a first bracket affixed to the at least one tubular.

8. The apparatus of claim 7, wherein the first bracket comprises a pair of angle brackets mounted side-by-side.

9. The apparatus of claim 7, wherein a third end of the second arms for the first and second supports each pivotally connect to the first bracket affixed to the at least one tubular; and wherein a fourth end of the second arms for the first and second supports each pivotally connect to a second doubler affixed to the fuselage.

10. The apparatus of claim 9, wherein a fifth end of the third arms for the first and second supports each pivotally connect to a second bracket affixed to the at least one tubular; and wherein a sixth end of the third arms for the first and second supports each pivotally connect to a third bracket affixed to the fuselage.

11. The apparatus of claim 10, wherein each of the first and second supports further comprise a fourth arm pivotally connected between the fuselage and the at least one tubular and supporting the same along the first axis, wherein a seventh end of the fourth arms for the first and second supports each pivotally connect to the second doubler affixed to the fuselage; and wherein an eighth end of the fourth arms for the first and second supports each pivotally connect to the second bracket affixed to the at least one tubular.

12. The apparatus of claim 1, further comprising:
   a third support disposed at a third of the support locations on the at least one tubular toward the first end thereof near the inlet, the third support having first, second, and third arms, the first arm pivotally connected between the fuselage and the at least one tubular and supporting the same along the first axis, the second arm pivotally connected between the fuselage and the at least one tubular and supporting the same along the second axis, the third arm pivotally connected between the fuselage and the at least one tubular and supporting the same along the first axis.

13. The apparatus of claim 12, wherein a first end of the first arm for the third support pivotally connects to a first bracket affixed to the fuselage; and wherein a second end of the first arm for the third support pivotally connects to a second bracket affixed to the at least one tubular.

14. The apparatus of claim 13, wherein the first and second brackets comprises a pair of angle brackets mounted side-by-side.

15. The apparatus of claim 13, wherein a third end of the second arm for the third support pivotally connects to the second bracket affixed to the at least one tubular; and wherein a fourth end of the second arm for the third support pivotally connects to a third bracket affixed to the fuselage.

16. The apparatus of claim 15, wherein a fifth end of the third arm for the third support pivotally connects to third bracket affixed to the fuselage; and wherein a sixth end of the third arm for the third support pivotally connects to a fourth bracket on the at least one tubular.

17. The apparatus of claim 12, further comprising:
   a fourth support disposed at a fourth of the support locations on the at least one tubular toward the second end thereof, the fourth support having first and second arms, the first arm pivotally connected between the fuselage and the at least one tubular and supporting the same along the first axis, the second arm pivotally connected between the fuselage and the at least one tubular and supporting the same along the second axis.

18. The apparatus of claim 17, wherein a first end of the first arm for the fourth support pivotally connects to a first bracket affixed to a double disposed on the fuselage; and wherein a second end of the first arm for the fourth support pivotally connects to a second bracket affixed to the at least one tubular.

19. The apparatus of claim 18, wherein a third end of the second arm for the fourth support pivotally connects to the second bracket affixed to the at least one tubular; and wherein a fourth end of the second arm for the fourth support pivotally connects to a third bracket affixed to a seam of the fuselage.

20. An aircraft according to claim 1, comprising:
the fuselage;
the engine exhaust with an outlet area disposed at a nose of the aircraft;
the sensor disposed at a location of the fuselage; and
the exhaust apparatus comprising an inlet, at least one tubular, and first and second supports.

* * * * *